United States Patent Office 2,726,873
Patented Dec. 13, 1955

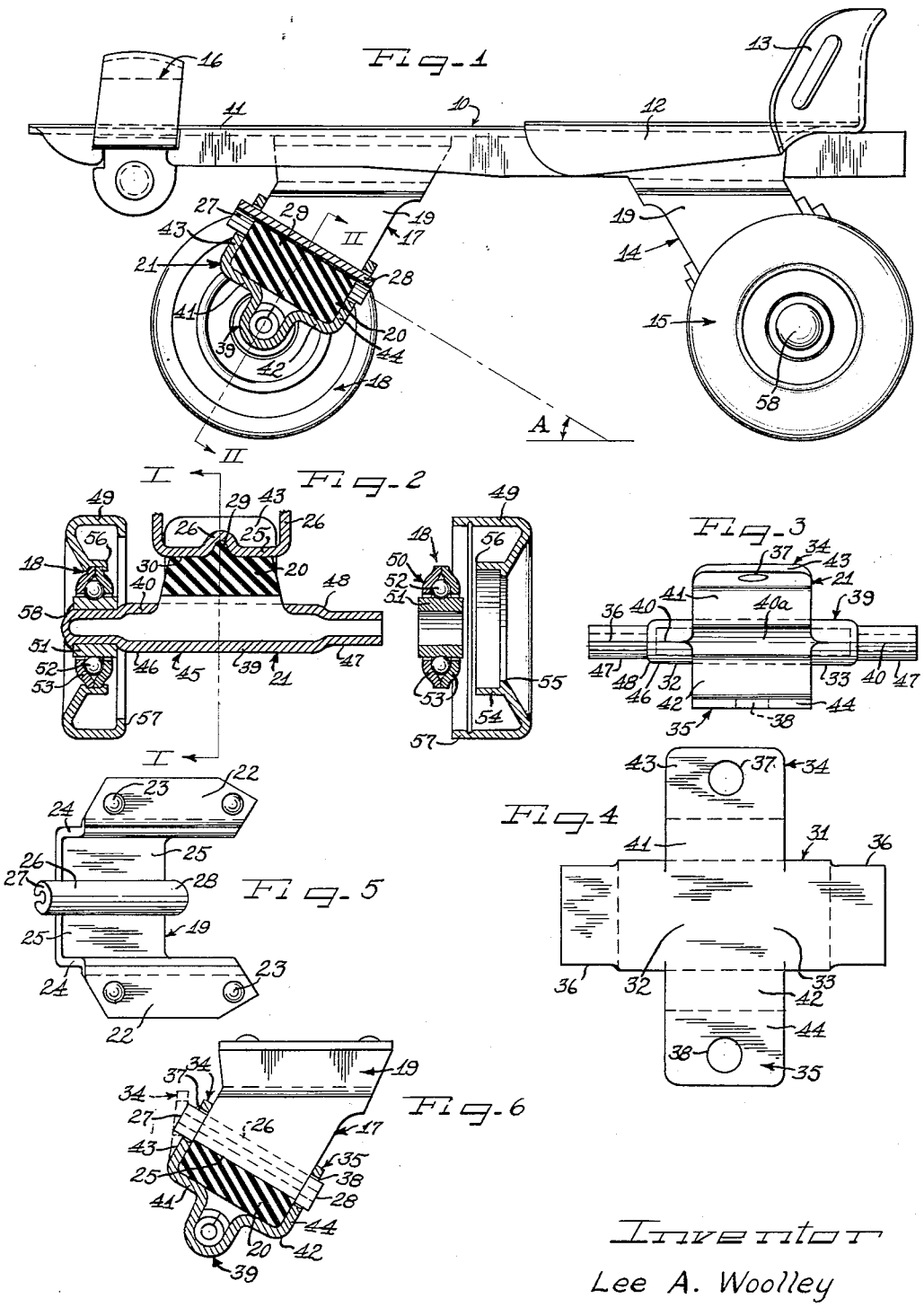

2,726,873
SKATE CONSTRUCTION AND METHOD OF MAKING SAME

Lee A. Woolley, Kokomo, Ind., assignor to Kingston Products Corporation, Kokomo, Ind., a corporation of Indiana Application August 30, 1950, Serial No. 182,256
16 Claims. (Cl. 280—11.28)

This invention relates to roller skate construction and, more particularly, to wheel support structures for roller skates.

In roller skate construction, a good portion of the expense of each skate is chargeable to the front and rear wheel support structures thereof. Under the present demand for a minimum of rolling friction and a minimum of vibration transmitted to the skater's feet, the complexity, and hence the cost, of wheel support structures has increased. The accommodation of a resilient cushion between the skate truck and the truck support bracket to give a wheel support structure with a low vibration transmission has, moreover, increased the assembly time of these elements with a consequent rise in labor costs. It is desirable that each of these elements should be inexpensive to produce and, likewise, that their assembly be less expensive without diminishing the sturdiness and safety required of a completed skate.

It is accordingly, an object of this invention to provide a skate truck and a truck support bracket which may readily be assembled.

It is a further object to provide a truck and truck support bracket so constructed and arranged as to accommodate a resilient cushion to lessen the transmission of vibration therebetween.

It is a further object to provide a skate truck frame which may be formed from a blank of workable sheet material and to which wheels can readily be added to complete the truck.

It is a further object of this invention to secure a resilient vibration-absorbing cushion against a cushion plate of the truck support bracket to absorb vibration proceeding from the truck. The truck attachment members, which attach to the support bracket, carry the vibration of the truck to this cushion.

Yet a further object is to form a pintle integrally with the truck support bracket and to interfittingly engage the pintle in bearing means carried by the truck attachment members, thereby permitting a degree of relative motion between the truck and the truck support brackets.

A specific object of this invention is to form a skate truck frame by simple operations upon a cross-shaped blank of workable sheet material, whereby the blank is converted into a sturdy tubular axle member with attachment members extending transversely therefrom.

A more specific object is to provide such a tubular axle member with outwardly-positioned wheel load bearing portions to receive the wheels. These portions are reduced in diameter relatively to inwardly adjacent portions of the axle member to form shoulders therewith and their outward extremities are upset to form wheel caps which cannot be loosened.

The invention has for a further and additional object the provision of a cushion plate for the truck support bracket, which has a channel impressed therein and extending forwardly and rearwardly thereof to form a pintle. The cushion is secured in the channel against lateral displacement relative thereto. The readily formed channel, thus, has the dual function of a cushion holder and a support pintle.

The invention has for a further and additional object the provision of wheel load bearing portions for the axle member which have a substantially cylindrical, tubular form closed off at the outward end thereof by a spun-over cap.

The above, other and further objects will be apparent from the following description and accompanying drawings of a specific embodiment of the present invention.

On the drawings:

Figure 1 is a side elevational view of a roller skate with the front wheel support structure in section along the line I—I of Figure 2;

Figure 2 is a sectional view of the forward truck taken along the line II—II of Figure 1, with the right wheel assembly shown in exploded view to illustrate the manner of assembly;

Figure 3 is a plan view of the truck frame in preassembly form;

Figure 4 is a developed view of the cross-shaped blank from which the truck frame is formed. The dashed lines indicate where the blank is to be bent or swaged;

Figure 5 is a top plan view of the front support bracket; and

Figure 6 is a side elevational view of the wheel support structure, wherein the truck frame is shown in section along the line I—I of Figure 2. In dotted lines, the forward attachment member of the truck frame is shown in its pre-assembled position.

Referring now to Figure 1, wheel support structures embodying the present invention are shown assembled in a completed skate. A sole plate 10 of the skate includes a toe plate 11 and a heel plate 12 slidably connected. A heel back 13 is supported upright from the heel plate 12, and a rear wheel support structure 14 and rear wheels 15 carried thereby are supported dependently from the heel plate 12. A toe clamp assembly 16 is carried forwardly on the toe plate 11, while a front wheel support structure 17 and front wheels 18 are dependent therefrom.

Since the front and rear wheel support structures 14 and 17 are exactly similar and are secured dependently from the sole plate 10 by the same means, the succeeding description applies equally well to either structure. It is evident, however, that the support structures 14 and 17 are attached to the sole plate 10 oppositely to diverge downwardly from the same.

The support structure 17 includes a truck support bracket 19, a resilient cushion 20 and a truck frame 21. The cushion 20 may suitably be composed of natural or synthetic rubber, or like resilient material. The truck support bracket 19 (Fig. 5) includes a pair of attachment plates 22, with welding knobs or bosses 23 upraised therefrom to facilitate the securement of the bracket 19 to the underface of the sole plate 10. The attachment plates 22 are integral portions of a single blank sheet material from which the support bracket 19 is formed. Side plates 24, a cushion plate 25 and a channel 26 formed therein constitute the remaining portions of the blank.

The channel 26 is oriented centrally of the cushion plate 25 and longitudinally with respect to the skate. Moreover, it extends forwardly beyond the cushion plate at 27 and rearwardly at 28 to constitute a pintle upon which the truck frame may be rotatively supported. The portions 27 and 28 of the channel are desirably re-entrant to a slight degree. The channel opens downwardly to receive a bead 29 formed in the top face of the rubber cushion 20 which is thus interfittingly engageable in the channel. Excepting this bead 29, the resilient cushion 20 is substantially rectangular in form. With the bead 29 secured in the channel 26 (Fig. 2), the upper face of the cushion 20 is in contact along surface 30 with the lower face of the cushion plate 25. The engagement of the bead 29 by the channel 26 will prevent lateral displacement of the cushion 20, that is, displacement transverse to the direction of the bead. Otherwise, the cushion 20 is not laterally confined. In this manner, the channel 26 serves both as a cushion securing means and as a pintle for supporting the truck frame 21.

The truck frame 21 (Fig. 4) may be formed from a cross-shaped blank 31 of workable sheet material having a first pair of opposite arms 32 and 33, and transversely thereto a second pair of opposite arms 34 and 35. The arms 32 and 33 are fashioned with parallel longitudinal edges 36. Arms 34 and 35 are provided with apertures 37 and 38, which are to constitute bearing means for the portions 27 and 28, respectively, of pintle 26.

The truck frame 21 (Figs. 3 and 6) comprises a longitudinally split tubular axle member 39 and attachment members which are the arms 34 and 35 of blank 31. The tubular axle member is formed by rolling the arms 32 and 33 transversely thereof to bring the edges 36 into abutting contact. A straight seam 40 formed by the edges 36 along the top of the axle member 39 is interrupted centrally thereof by a gapped portion 40a between the attachment members 34 and 35. Bent oppositely away from the gapped portion 40a are first portions 41 and 42 of the axle attachment members 34 and 35, respectively. From the first portions 41 and 42, which are approximately coplanar, second portions 43 and 44 extend upwardly. In the pre-assembly form of the truck frame 21, the second portion 43 is inclined at an obtuse angle to its associated first portion 41 of the attachment member 34. The second portion 44 is normal to its associated first portion 42. The earlier mentioned apertures 37 and 38 are seen to lie centrally in the respective portions 43 and 44 and to be aligned transversely of the axle member 39. In assembled form, the second portions 43 and 44 lie in parallel planes spaced apart a distance approximately equal to the span of the cushion plate 25 (Fig. 6).

Thus, to assemble the wheel support structure 17, the bead 29 of the cushion 20 is inserted in the channel 26, the truck frame 21 is brought up beneath the cushion 20, the pintle portion 28 is received in the aperture 38, and the second portion 43 is bent normal to the first portion 41 to bring the pintle portion 27 into the aperture 37. The dimensions of the cushion 20 are sufficiently in excess of the confining volume that it will normally exert a compressive force against the portions 41, 42, 43 and 44, and against the cushion plate 25 and the channel 26. The relative motion possible between the truck frame 21 and the truck support bracket 19 is confined principally to rotation about the pintle 26. This relative movement of the truck frame may be termed the action of the truck, and the angle of inclination of the axis of the pintle 26 may be termed the action angle, denoted A (Fig. 1). Correspondingly, the plane normal to this axis may be termed the action plane.

The section of Figure 2 is taken along this action plane, and illustrates particularly the assembly of the truck, indicated by the reference numeral 45. The truck 45 comprises the truck frame 21 and the wheels 18 assembled on each end of the axle member 39 of the truck frame. To receive the front wheels 18, outward lengths of the axle member 39 are reduced in diameter relatively to inwardly adjacent portions 46 to form wheel load bearing portions 47. The reduction in diameter forms a shoulder 48 between the portions 46 and 47. As the seam 40 (Fig. 3) is preserved during the swaging or like process used for diminishing the diameter, the wheel load bearing portions 47 will have a substantially cylindrical exterior surface.

Prior to assembly on the truck frame 21, the wheels 18 are assembled so that each includes a roller 49 and a ball bearing assembly 50. The ball bearing assembly 50, which includes wheel bearing sleeve 51, balls 52 and cover rings 53, are received in a hub 54 against a stop 55. Flange 56 of the hub 54 is then spun over against the cover rings 53 to secure the ball bearing assembly 50 in proper alignment. Roller flanges 57 are also spun over. The wheels 18 are then assembled on the truck frame 21 by pressing the bearing sleeve 51 upon the wheel load bearing portions 47. The outward extremities of the wheel load bearing portions 47 are then spun over to form caps 58 which close off the outward ends of the axle member 39 and hold the bearing sleeves 51 against the shoulders 48. Preferably, the caps 58 will be given a conical shape for improved appearance and structural strength.

The completed wheel support structure is, then, both sturdily and safely constructed. The load on the sole plate 10 is distributed between the front and rear wheel support structures 14 and 17, passing from the cushion plate 25 to the cushion 20, thence to the axle attachment members 34 and 55 and to the sturdy, tubular axle member 39. A small proportion of the load is readily borne by the rigid, integral pintle 26. The cushion 20 is securely confined by the attachment members 43 and 44 and by the cushion plate 25 and its associated channel 26. The caps 58, being integral with the associated wheel load bearing portion 47, can never work loose to cause loss of a wheel.

The truck support bracket 19 and the truck frame 21 may each be formed readily from single blanks of workable sheet material by forming operations, such as cutting, bending, and spinning. A minimum of labor is required to assemble the cushion 20 and the truck frame 21 to the support bracket 19, and then to secure the wheels to the truck frame.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a skate, a truck comprising a longitudinal split tubular axle member, outward longitudinal edge portions thereof abutting to form alined seams for said axle member, said seams lying in a common plane with the axis of said axle member, said common plane being inclined normal to the action angle of said truck, opposite truck attachment arms extending transversely from said axle member, and bearing means supported by said arms at the action angle of said truck.

2. In a skate, a truck comprising an axle member having outward tubular wheel bearing portions and an intermediate gapped portion, attachment members integral with said intermediate gapped portion and having substantially coplanar first portions extending oppositely from said gapped portion and second portions extending upwardly in planes normal to the plane of said first portions, and bearing means carried by said second portions and alined normal thereto.

3. In a skate, the combination comprising a truck support bracket, a cushion plate carried by said bracket, a channel impressed in said plate extending longitudinally of said skate and forwardly and rearwardly beyond said plate to form a pintle, a cushion received in said channel and in contact with said plate, a truck including an axle member having outward longitudinally split tubular wheel bearing portions and an intermediate gapped portion, attachment members integral with said gapped portion and having substantially coplanar first portions extending oppositely from said axle member and second portions extending upwardly in planes normal to the plane of said first portions, said second portions having apertures therein alined transversely of said axle member interfittingly engaged with said pintle, and said cushion compressed between said plate and said first portions and constrained by said second portions to resist relative movement between said truck and said bracket.

4. In a skate, the combination comprising a truck support bracket, a cushion plate carried by said bracket, a channel impressed in said plate extending longitudinally of said skate and forwardly and rearwardly beyond said plate to form a pintle, a cushion secured in said channel and in contact with said plate, a truck including an axle member having endwise tubular wheel bearing portions and an intermediate gapped portion, support arms extending from said gapped portion divergently to form a base opposing said plate and in contact with said cushion, bearing means on each of said arms, said arms extending forwardly and rearwardly of said cushion to interfittingly engage said pintle in said bearing means, whereby said cushion resists relative motion between said axle member and said bracket.

5. A roller skate wheel truck comprising a sheet form member bent generally back upon itself and shaped to provide a tubular axle having a cylindrical hub at opposite ends thereof and further characterized by flanged medial arm portions extending from opposite sides of said axle and together forming a recessed mounting bracket for attachment with a roller skate, and a wheel bearing on each hub, the respective ends of said axle being offset to provide a radially outwardly extending retainer flange engaging each wheel bearing.

6. A roller skate wheel truck as defined in claim 5 and a roller skate wheel rotatably journaled by each said wheel bearing.

7. A roller skate wheel truck as defined in claim 5, said medial arm portions lying in co-planar relation and having the flanged portions thereof offset to provide spaced parallel bracket members.

8. A roller skate wheel truck as defined in claim 5, each said cylindrical hub being reduced in diameter relative to inwardly adjacent portions to form an annular wheel retaining shoulder.

9. A roller skate wheel truck as defined in claim 8, the extremities of each said hub being offset to provide said radially outwardly extending wheel retaining flange spaced axially away from said annular wheel retaining shoulder.

10. A roller skate wheel truck as defined in claim 9, the extremities of each said hub being further offset radially inwardly to close each respective end of said tubular axle.

11. A roller skate truck support bracket, comprising, a sheet form bent to provide a web, parallel spaced apart flanges offset from said web and having mounting means on the respective ends thereof adapted to be connected to a roller skate frame, and an upstanding longitudinally extending medial boss portion formed in said web providing a rib in one face of said web and a recess in the opposite face of said web and having the end portions thereof projecting longitudinally beyond opposite transverse edges of said web to provide a pintle, a wheel truck having longitudinally spaced apart apertured bracket arms receiving the opposite projecting ends forming said pintle and a resilient cushion between said wheel truck and said bracket confined against longitudinal movement by said bracket arms and having portions thereof received in said recess to preclude lateral displacement thereof and retaining said wheel truck and said support bracket in assembly with one another.

12. A roller skate wheel truck comprising a sheet form member bent generally back upon itself and shaped to provide a tubular axle having a cylindrical hub at opposite ends thereof, and further characterized by arms extending from opposite sides of said axle including opposed co-planar arm portions each having an offset arm portion spaced apart and generally parallel to one another, said parallel offset arm portions each having an opening formed therein, a skate frame having a pintle extending transversely of said axle and having end portions received in said openings, and a resilient cushion between said co-planar arm portions and said pintle to retain said frame and said truck in assembly with another.

13. A roller skate, comprising, front and rear frame members lying in generally co-planar relationship and each mounted on an underlying truck assembly extending in diverging direction with respect to one another, each truck assembly being identical and each truck assembly comprising, a truck support bracket having spaced apart arm portions joined by a web inclined at a predetermined action angle relative to the horizontal, said web having a struck-out boss formed therein forming a rib on one face thereof and a recess in the opposite face thereof, said boss extending along an axis inclined at said action angle and projecting beyond opposite edges of said web to provide a pintle, a wheel truck comprising a sheet form member bent back upon itself and shaped to provide a tubular axle having cylindrical hub ends and further characterized by opposed co-planar arm portions extending from opposite sides of a medial portion of said axle, each arm portion having an offset flange, said offset flanges together providing spaced apart parallel flanges each having an opening therein receiving a corresponding end of said pintle, the axis of said hub ends lying in a plane normal to said action angle called the action plane, a resilient cushion confined between said spaced parallel flanges and between said co-planar arm portions and said web, portions of said cushion being received in said recess, and said cushion operable to resiliently load said wheel truck and said truck support bracket into firm assembly with one another, a wheel on each hub end and an offset portion on the extremity of each hub end providing a radially outwardly extending wheel retainer flange and further providing a radially inwardly extending closure flange closing the hub ends of said axle.

14. A roller skate wheel truck as defined in claim 5, said wheel bearing constituting a sleeve member, a roller skate wheel comprising a first sheet-form member shaped to provide a generally annular wheel shell having a peripheral band-like roller portion adapted to engage a supporting surface and a generally inwardly extending side wall terminating in a radially inwardly spaced inner hub which extends generally concentrically parallel to said roller portion, a pair of cover rings comprising sheet-form members shaped and arranged to provide opposed dished washer shaped retainers together with one another forming an annular ball race, a plurality of shiftable members engaging the peripheral surface of said skate wheel bearing sleeve member and confined in said ball race to rotatably support said retainers on said wheel bearing sleeve member, the peripheral edges of said retainers being firmly assembled in said inner hub.

15. A roller skate wheel as defined in claim 14, said roller portion having a radially inwardly turned roller flange on the extremities thereof to rigidify the wheel shell.

16. A roller skate wheel as defined in claim 14, said inner hub having struck-over portions extending radially inwardly thereof and engaging said retainers to retain same in firm assembly with said inner hub.

References Cited in the file of this patent

UNITED STATES PATENTS

| | | |
|---|---|---|
| 383,188 | Munz | May 22, 1888 |
| 647,801 | Bruner | Apr. 17, 1900 |
| 655,673 | Everett | Aug. 7, 1900 |
| 808,736 | Einfeldt | Jan. 2, 1906 |
| 948,063 | Morton | Feb. 1, 1910 |
| 1,118,110 | Francisci | Nov. 24, 1914 |
| 1,458,243 | Reach | June 12, 1923 |
| 1,542,103 | Shoemaker | June 16, 1925 |
| 1,902,726 | Schacht | Mar. 21, 1933 |
| 1,987,668 | Coldwell | Jan. 15, 1935 |
| 2,058,820 | Pardon et al. | Oct. 27, 1936 |
| 2,069,480 | Riemenschneider et al. | Feb. 2, 1937 |
| 2,075,271 | Coldwell | Mar. 30, 1937 |
| 2,104,536 | Coldwell | Jan. 4, 1938 |
| 2,127,630 | Kees | Aug. 23, 1938 |
| 2,199,502 | Maddock | May 7, 1940 |
| 2,531,357 | Foulds | Nov. 21, 1950 |